US008212480B2

(12) United States Patent
Moriyasu et al.

(10) Patent No.: US 8,212,480 B2
(45) Date of Patent: Jul. 3, 2012

(54) CERAMIC DISCHARGE LAMP INCLUDING FIRST AND SECOND LAYER OF BRAZING MATERIAL AND METHOD OF MANUFACTURING CERAMIC DISCHARGE LAMP (75) Inventors: Kengo Moriyasu, Hyogo (JP); Yukihiro Morimoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 36 days.

(21) Appl. No.: 12/659,427

(22) Filed: Mar. 9, 2010

(65) Prior Publication Data
US 2010/0231129 A1 Sep. 16, 2010

(30) Foreign Application Priority Data

Mar. 10, 2009 (JP) ................. 2009-056635

(51) Int. Cl.
*H01J 61/36* (2006.01)
*H01J 17/16* (2012.01)
*H01J 9/26* (2006.01)
(52) U.S. Cl. ........ 313/624; 313/623; 313/634; 313/635; 228/124.6; 445/44; 445/43
(58) Field of Classification Search ............. 313/607, 313/637, 624; 445/26, 44, 43
See application file for complete search history.

(56) References Cited

U.S. PATENT DOCUMENTS

| 4,917,642 | A  | * | 4/1990  | Nakahashi et al. | 445/44  |
| 5,916,520 | A  | * | 6/1999  | Maruyama et al.  | 420/492 |
| 6,399,019 | B1 | * | 6/2002  | Sakuraba et al.  | 420/501 |
| 2006/0243776 | A1 | * | 11/2006 | Tada et al.   | 228/101 |
| 2008/0274362 | A1 | * | 11/2008 | Kramer        | 428/426 |

FOREIGN PATENT DOCUMENTS

| JP | 62-217533 A   | 9/1987  |
| JP | 08-236084 A   | 9/1996  |
| JP | 08-329896 A   | 12/1996 |
| JP | 2006-318656 A | 11/2006 |

* cited by examiner

*Primary Examiner* — Sikha Roy
(74) *Attorney, Agent, or Firm* — Rader, Fishman & Grauer PLLC (57) ABSTRACT

A ceramic discharge lamp in which an electric discharge gas is enclosed in an arc tube which is made up of a ceramic member and a metal member. The ceramic discharge lamp includes a first brazing material, which is formed so as to be fixed on a surface of the ceramic member without being covered with the metal member; a titanium layer, which is formed between the first brazing material and the ceramic member; and a second brazing material, which is continuously formed from the first brazing member, that covers part of the metal member so that the ceramic member and the metal member are airtightly joined to each other.

6 Claims, 9 Drawing Sheets

CERAMIC DISCHARGE LAMP INCLUDING FIRST AND SECOND LAYER OF BRAZING MATERIAL AND METHOD OF MANUFACTURING CERAMIC DISCHARGE LAMP

CROSS-REFERENCES TO RELATED APPLICATION

This application claims priority from Japanese Patent Application Ser. No. 2009-056635 filed Mar. 10, 2009, the contents of which are incorporated herein by reference in its entirety.

TECHNICAL FIELD

The present invention relates to a ceramic discharge lamp in which a transparent portion of an arc tube is made of ceramic, and a manufacture method thereof.

BACKGROUND

Quartz glass or ceramic is suitably used for a transparent portion of an arc tube of a discharge lamp, so that the arc tube may efficiently transmit light generated in an electrical discharge space of the discharge lamp, and so as to withstand a high temperature due to an electric discharge arc. The translucent ceramic becomes an indispensable component as a composition material of the arc tube when the above-mentioned quartz glass cannot be used because of the property of gas to be enclosed in the electrical discharge space. Of course, in some cases, for example, where the quartz glass becomes clouded depending on an operating temperature of a lamp, the ceramic arc tube is suitably chosen and used based on the kind of the lamp and the use thereof. Examples of such lamps are disclosed in Japanese Patent Application Publication No. H08-236084 (an excimer lamp), Japanese Patent Application Publication No. H08-329896 (a metal halide lamp), and Japanese Patent Application Publication No. 2006-318656 (a flash lamp) etc.

Figure 9A:
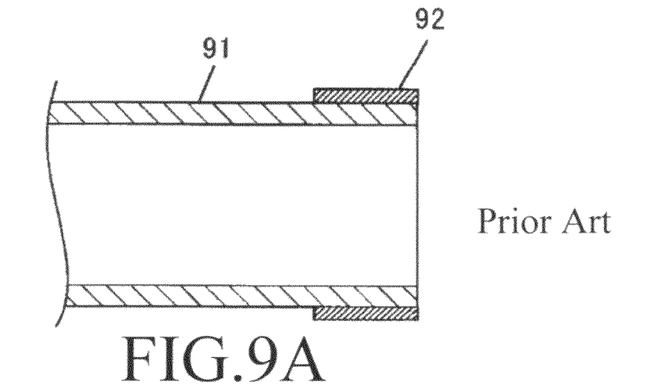
FIGS. 9A, 9B and 9C are explanatory diagrams showing steps of a sealing process of a conventional discharge lamp.
Figure 9B:
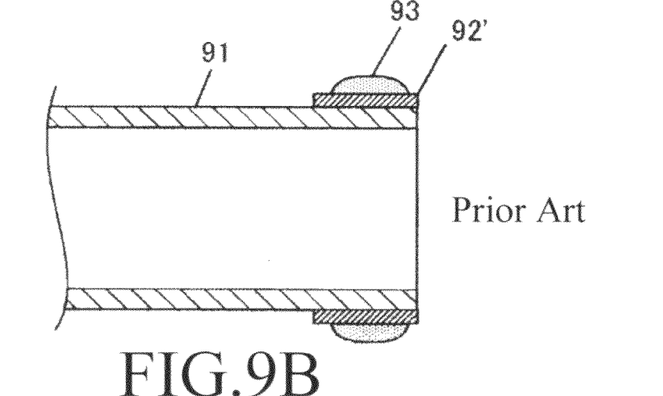
Figure 9C:
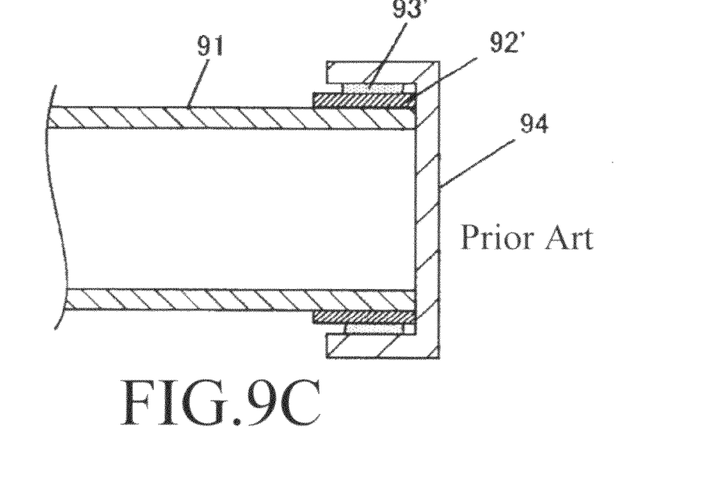

The ceramic material of a transparent portion of such a ceramic arc tube is YAG or single crystal sapphire. Sealing members are in an approximately disk-like lid shape, and are airtightly attached to each end portion of a cylindrical pipe with a silver soldering. Steps of a sealing process will be described below, referring to FIGS. 9A through 9C, which are explanatory diagrams of the steps of the sealing process. (1) Paste-like material 92 for forming a metallized layer is coated on an end portion of a tubular ceramic member 91 (FIG. 9A). (2) The ceramic member 91 is heated at 1400° C. or more, and the metallized layer is calcinated. (3) Paste-like brazing material 93 is coated on the calcinated metallized layer 92' (FIG. 9B). (4) A lid portion material 94 is put on the ceramic member 91, and they are put in a baking furnace for calcination (FIG. 9C). (5) Air is discharged from the inside of the pipe by using an exhaust pipe formed on the lid portion material 94, and after the gas for electric discharge is enclosed, the exhaust pipe is sealed. In addition, in FIG. 9C, a reference number 93' indicates a brazing material which is fixed thereto after it is melted by the calcination.

Thus, in a manufacture method of a discharge lamp, it is necessary to perform metallizing processing to at least part of an end portion(s) of the ceramic member 91 where the brazing material 93 (93') is formed. This is because it relates to the wetness of the brazing material, that is, it is necessary to form a metal layer as a base for the brazing on the ceramic surface, since the wetness of the brazing material is lower than that of ceramic.

However, the metallizing processing, which is indispensable to the brazing, requires a treatment at a high temperature of 1400° C. or more in non-oxidizing atmosphere. Therefore, although this is a pre-processing prior to the brazing of such a discharge lamp, there is a problem that time is required therefore and energy cost thereof is high. In addition, in the metallizing processing, it is necessary to put the arc tube composition material in a hot kiln and leave it for a fixed time. At this time, substances, such as metal, may float from components of the metallizing layer, and baking may occur inside the arc tube due to the high temperature. Therefore, when a very small quantity of substance, which enters and is mixed into the arc tube, is exposed to electric discharge, an expected lamp performance may not be demonstrated.

SUMMARY

It is an object of the present invention to offer a discharge lamp having a ceramic arc tube, in which a high airtightness thereof can be maintained by brazing a brazing material thereon, without forming a metallizing layer in a joint portion of a ceramic member and a metal member. In addition, it is another object of the present invention to offer a manufacture method of a discharge lamp having a ceramic arc tube, which is capable of maintaining the high airtightness thereof, without forming a metallizing layer in a joint of a ceramic member and a metal member, even in case of joining by brazing.

According to the present invention, a ceramic discharge lamp encloses an electric discharge gas in an arc tube, which is made up of a ceramic member and a metal member. The lamp further includes a brazing material is formed so as to be fixed on a surface of the ceramic member without being covered with the metal member, a titanium layer formed between the brazing material and the ceramic member, and another brazing material, which is continuously formed from the brazing member, that covers part of the metal member so that the ceramic member and the metal member are airtightly joined to each other. In addition, the metal member may consist of nickel or nickel alloy, and the brazing material on the ceramic member and the titanium layer may be formed so as to be fixed, up to a portion at a predetermined distance from the metal member. Further, the brazing material may be a silver solder.

In addition, the present method of manufacturing a ceramic discharge lamp having an arc tube made up of a ceramic member and a metal member comprises: forming a first brazing material containing titanium of 0.5-10 Wt %, on a surface of the ceramic member; and forming a second brazing material on a surface of the metal member, wherein the metal member is located at an end portion of the ceramic member so that part of the first brazing material is exposed, and raising temperature of the ceramic member and the metal member to a brazing temperature so that the first brazing material and the second brazing material are melted for fixation in a state where the first brazing material and the second brazing material are continuously formed; and airtightly enclosing electric discharge gas in the arc tube. The first brazing material formed on the ceramic member may be an active silver solder.

In the ceramic discharge lamp according to the present invention and a ceramic discharge lamp manufactured by the manufacture method according to the present invention, since brazing of the airtightly sealed structure of the arc tube is performed by using brazing material containing titanium so that a thin layer containing the titanium is formed on the ceramic surface, the wetness of the brazing material is improved, whereby the metal member can be connected to the ceramic only by the brazing work, without forming a metallized layer.

BRIEF DESCRIPTION OF DRAWINGS

Other features and advantages of the present ceramic discharge lamp and the present method of manufacturing a ceramic discharge lamp will be apparent from the ensuing description, taken in conjunction with the accompanying drawings, in which.

DESCRIPTION

Figure 1:
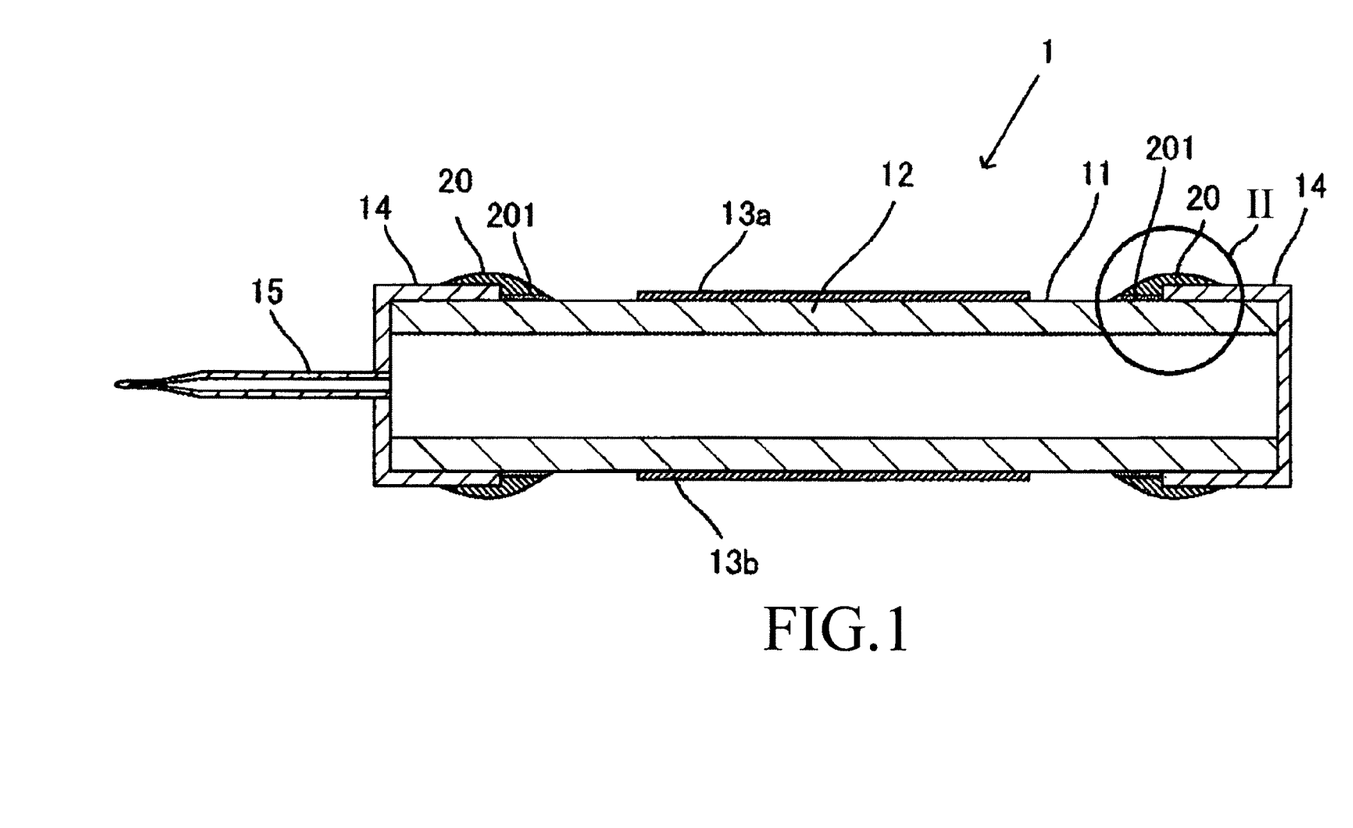
FIG. 1 is a explanatory cross sectional view of a discharge lamp according to an embodiment of the present invention, taken along a tube axis thereof.
Figure 2:
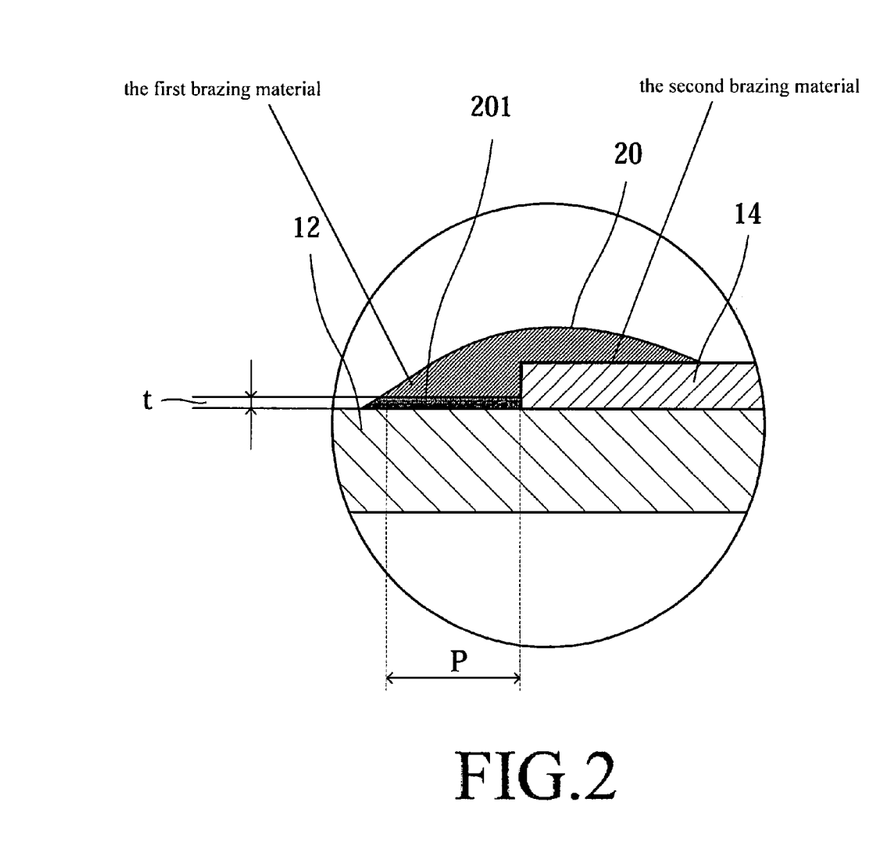
FIG. 2 is an enlarged view of a circled portion II of FIG. 1 which is a brazing portion.

Description of an embodiment of a ceramic discharge lamp according to the present invention will be given below. Argon (Ar) and fluorine (F) are enclosed as electric discharge gas in the discharge lamp made from ceramic (hereinafter referred to as simply a "discharge lamp"). The discharge lamp is an excimer lamp in which pair of external electrodes is formed on an outer surface of an arc tube. In addition, FIG. 1 is a cross sectional view of the discharge lamp according to the embodiment of the present invention, taken along a tube axis thereof, and FIG. 2 is an enlarged view of a main part thereof. As shown in FIG. 1, the discharge lamp 1 according to the present embodiment is made up of a tubular ceramic member 12, and cap-like metal members 14 arranged along both end faces thereof, thereby forming the arc tube 11. The ceramic member 12 has a straight pipe-like shape, as shown in the figure. Specifically, translucent ceramic material, such as sapphire, YAG, or single crystal yttria, is used as the material thereof. The ceramic is used for the excimer lamp in this example, because glass cannot be used since fluorine is used for electric discharge gas.

The external electrodes 13a and 13b in a shape of a strip are formed on an outer circumferential surface of the ceramic member 12 and formed apart from each other, so as to extend in a direction where the tube 12 extends, and further are made from a conductive material layer. Although not shown, lead wires are connected to the respective electrodes 13a and 13b with soldering etc. The electric conduction material for forming these external electrodes 13a and 13b (conductive material layer) can be arbitrarily chosen from well-known electric conduction materials. In addition, when light from a portion of the arc tube 11 where the electrode is formed is emitted a transparent electrode (ITO) is used.

The metal members 14 consist of metal with a good heat conduction property, preferably nickel or a nickel alloy. The nickel alloy is, for example, Ni—Cr alloys, Ni—Cu alloys, and Ni—Fe alloys, and in general, alloys containing nickel of 25 wt % or more.

The metal members 14 are cylindrical and have a bottom, in which the inner diameter of a cylinder section thereof is suitably sized so as to fit for the outer diameter of the ceramic member 12, so that the openings are closed so as not to be airtight, by inserting them in the shape of a cap at the respective end portions of the ceramic member 12. And brazing material 20 (specifically, brazing material that was not melted is heated so as to be melted, and after that, it is in a fixed state) airtightly joins the ceramic member 12 and the respective metal members 14 by providing the brazing material 20 near the outer circumference edges of the metal members 14 so as to cover both of the outer circumferential surfaces of the ceramic member 12 and the respective metal members 14, whereby the arc tube 11 is formed. In addition, one of the metal members 14 includes an exhaust pipe remaining portion 15. This exhaust pipe remaining portion 15 also consists of metal with good heat conductivity, for example, nickel, and a nickel alloy. Since both of the exhaust pipe and the metal members 14 consist of metal, they are airtightly connected with well-known means, such as welding and brazing.

FIG. 2 is an enlarged view of a brazed portion of FIG. 1, which is surrounded by a circle in the figure. A layer 201 made of dense titanium (Ti) is formed below the brazing material 20 so that the surface of the ceramic member 12 may be covered. The thickness t of the layer 201 is 0.1-5 μm (micrometers), and the brazing material 20 is formed so that, while this titanium layer 201 is covered with the brazing material 20, the outer circumferential surfaces of the metal members 14 may be covered therewith. When a nickel metal is used for the metal members 14 as in this embodiment, desirably an area P where both the brazing material 20 and the titanium layer 201 are formed, is formed without discontinuation so as to reach a position at the predetermined distance from this metal member 14 (practically, 2 mm or more therefrom).

Thus, for the formation of the titanium layer 201, non-melted brazing material can be obtained by using an active silver solder, such as Ag—Cu—Ti brazing materials or Ag—Cu—In—Ti brazing materials. As to the active silver solder, titanium is contained in a silver solder component containing silver-copper, so that when it is heated at a brazing temperature (Ag—Cu—Ti brazing material: 780-800° C., Ag—Cu—In—Ti brazing material: 620-720° C.), the titanium condenses on the ceramic so that a precise layer is formed. Consequently, after the fixation, the silver solder of the brazing material 20 is coated on the metal members 14 made of the same component as that of the so-called silver solder, such as Ag—Cu or Ag—Cu—In etc, so as to be strongly bound with the metal (nickel or nickel alloy), thereby firmly, and airtightly adhering thereto with thermal resistance, corrosion resistance, adhesion, etc.

And since the titanium layer 201 is formed on the brazed portion of the surface of the ceramic member 12, the conformity of the brazing material 20 to the surface becomes good, so that it is possible to braze it on the ceramic surface (strictly speaking, on the titanium layer), without performing a metallizing processing.

Such a discharge lamp can be manufactured in steps of a process set forth below.

Figure 3A:
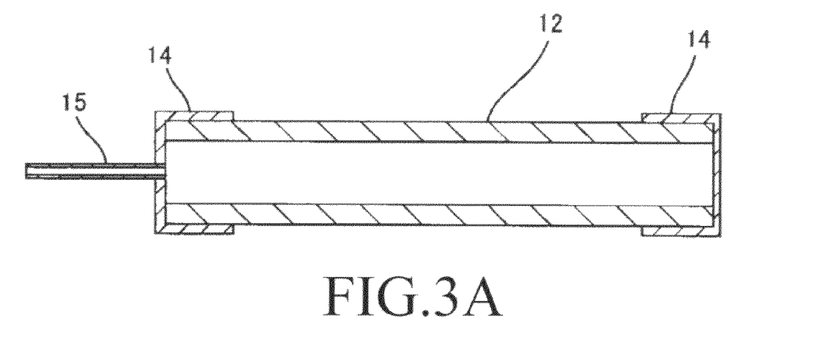
FIGS. 3A and 3B are diagrams for explaining a manufacture method of a discharge lamp according to an embodiment of the present invention.

(1) As shown in FIG. 3A, the cap-like metal members 14 are placed in the end portions of the tubular ceramic members 12, so as to cover the respective end portions thereof.

Figure 3B:
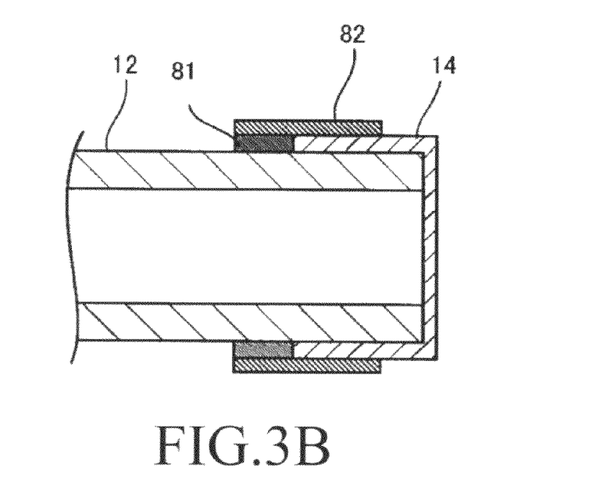

(2) As shown in FIG. 3B, foil-like active silver solder (Ag—Cu—Ti brazing material or Ag—Cu—In—Ti brazing material), which serves as a first brazing material 81, is arranged on the outer surface, which is near the end portion of the ceramic member 12, and is not covered with the metal members 14, so as to cover the entire circumferences of the tube, and furthermore, a second brazing material 82 is arranged on the first brazing material 81 and the metal member(s) 14. The second brazing material 82 is not limited to the above material, as long as it can easily bound with the first brazing material 81, for example, silver solder (Ag—Cu brazing material). This second brazing material may contain titanium or may not contain it. That is, there is no problem even if an active silver solder is used as the second brazing material.

(3) Next, in order to melt the first and second brazing materials, this ceramic member is arranged and heated in a vacuum furnace. The processing conditions are maintained, for example, for 10 minutes at 800° C. as an attained temperature. Consequently, the foil-like brazing material is melted and the brazing step is completed in a state where the titanium layer 201 is formed, as shown in FIG. 2.

(4) After an appropriate time, air is discharged from the inside of the completed ceramic member 12 by using the exhaust pipe 15 which has been connected to the metal member 14, and predetermined gas is enclosed, and then the exhaust pipe 15 is chipped-off.

(5) After that, external electrodes are formed at the predetermined position of an outer surface of the arc tube 11.

Thus, brazing is carried out after the active silver solder containing titanium is arranged on the ceramic member 12. The titanium (Ti) contained in the brazing material 81 condenses on a surface of the ceramic during heating, thereby firmly forming the dense titanium layer 201, whereby the conformity of the brazing material and the ceramic is improved, thereby making brazing possible.

In addition, although the foil-like brazing material is used in the above embodiment, the brazing material in form of paste having the same component may be used.

Figure 4A:
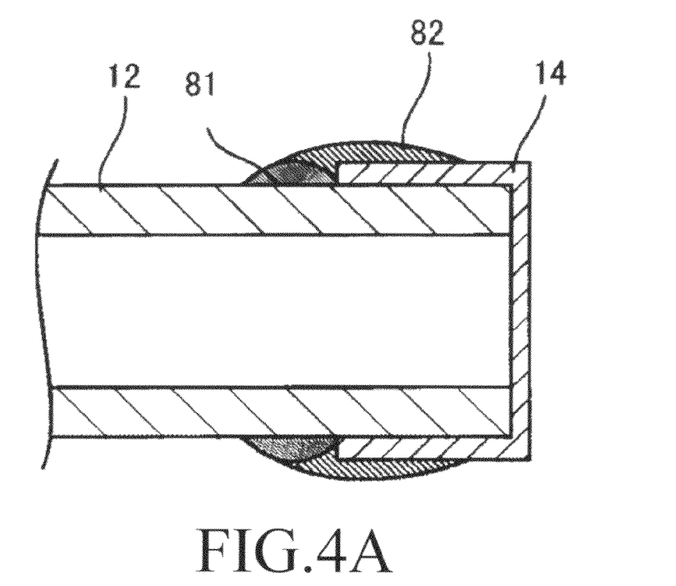
FIGS. 4A and 4B are explanatory cross sectional views of another embodiment of the present invention, taken along a tube axis thereof.
Figure 4B:
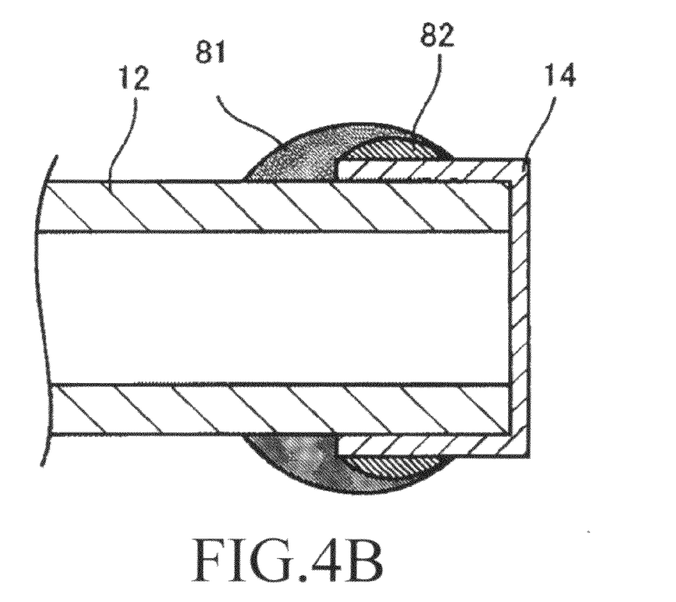

FIGS. 4A and 4B show examples where paste-like brazing material is coated on the ceramic member. As shown in FIG. 4A, a first brazing material containing titanium is prepared, and is applied on a surface of the ceramic member, and a second brazing material applied on metal member is formed in a succession of the first brazing material, or as shown in FIG. 4B, the second brazing material may be formed on the metal member, and the first brazing material may be formed so as to cover both of the second brazing material and the ceramic member. In either case, after it is heated to a brazing temperature, the titanium layer is formed on the ceramic surface, and then the brazing material is formed and fixed on the titanium layer, so that, as shown in FIGS. 1 and 2, it is possible to attain the airtight junction by brazing.

Figure 8:
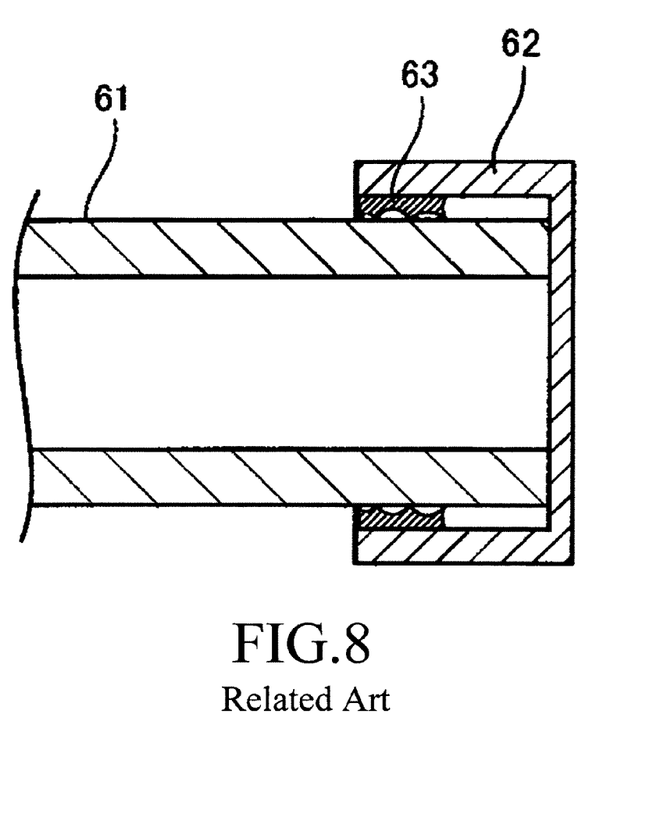
FIG. 8 is an enlarged cross sectional view of main part of a discharge lamp, explaining a manufacturing method of the discharge lamp, which is related to and different from the present invention.

Even in case where an active silver solder is used in this manner, cautions are required when a nickel metal is used for the metal member. For example, as shown in the related art of FIG. 8, when active silver solder is arranged to be merely sandwiched between the ceramic member 61 and the cap-like metal member 62, titanium is attracted to nickel by heating at the brazing temperature thereby forming an alloy. As a result, since the titanium on the surface of the ceramic runs short, the titanium layer cannot be formed on the ceramic surface, but a portion between the ceramic and the brazing material becomes porous so that airtight joining cannot be made.

In order to avoid such a problem, as in the present invention shown in FIGS. 3B and 4A, it becomes indispensable to arrange the first brazing material 81 (active silver solder, titanium containing brazing material) arranged on the ceramic member 12 so that only the surface of the ceramic member 12 may be covered therewith. Further, it is required to arrange the second brazing material 82 arranged on the metal members 14, so as to be continuously formed with the first brazing material 81. If the first brazing material 81 is formed in a range larger than a regular brazing area, and up to a position apart from the metal member 14 to some extent, the titanium layer 201 can be formed on a surface of the ceramic member 12, and the airtight state of the arc tube can be acquired certainly and stably.

Figure 5A:
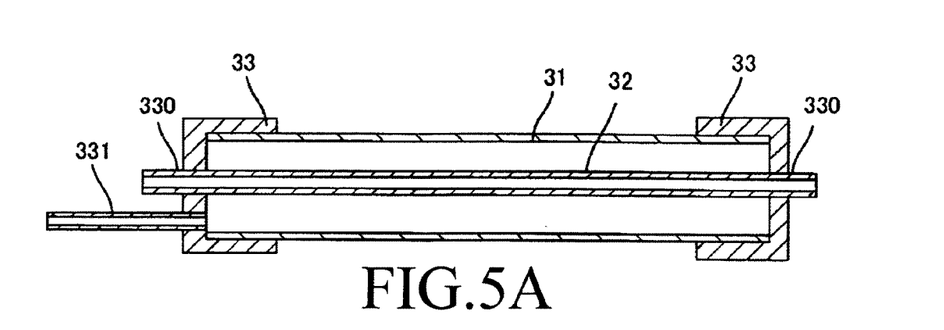
FIGS. 5A, 5B and 5C are explanatory cross sectional views of still another embodiment of the present invention, taken along a tube axis thereof.

A manufacture method of a lamp according to another embodiment of the present invention is described below referring to FIGS. 5A through 5C. The ceramic discharge lamp is an excimer lamp having the same structure as that described above, except for the structure of an arc tube. This is an example where two tubular ceramic members whose diameters are different from each other are used, wherein it has a first ceramic member 31 having a comparatively large diameter, and a second ceramic member 32 having a diameter smaller than that. Cap-like metal members 33 are arranged by respectively inserting them in both-end outer circumferences of the first ceramic member 31, and when an end portion of the second ceramic member 32 is inserted in the inside of a hole 330 formed on the central part of the metal member 33, the second ceramic member 32 is supported by the metal members 33, and the first and second ceramic members form a double pipe structure. In addition, an exhaust pipe 331 is airtightly connected to one of the metal members 33.

Thus, in a state where the first and second ceramic members 31 and 32, and the metal member 34 are arranged and mechanically joined, the first brazing material 34 made from brazing material containing titanium (preferably active silver solder (Ag—Cu—Ti brazing material or Ag—Cu—In—Ti brazing material)) is provided on the surfaces of the first and second ceramic members 31 and 32 respectively. Furthermore, the second brazing material 35 is arranged on each surface in the side of the opening of the metal member 33. If, as in this example, the metal member 33 has a thickness to some extent, it is not necessary to provide the second brazing material 35 on the outer circumferential surface of the metal member. The second brazing material 35 is not limited to that described above. Therefore, the same brazing material as the first brazing material may be used, or different brazing material, for example, a silver solder etc., may be used.

Figure 5B:
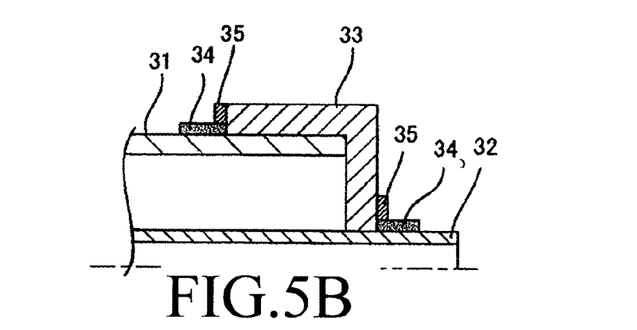
Figure 5C:
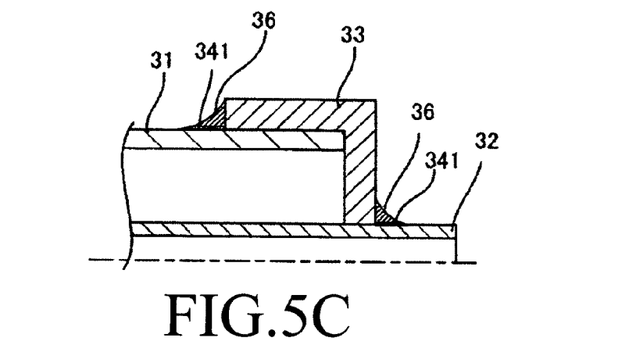

As shown in FIG. 5B, the assembly body of the ceramic members 31 and 32 and the metal members 33 are put into a vacuum furnace in a state where the first and second brazing materials 34 and 35 have been provided on the required portions, and the assembly body is heated in an vacuum atmosphere of $1 \times 10^{-2}$ Pa or less, at temperature of 800° C. for 10 minutes, so as to perform brazing processing. Consequently, as shown in FIG. 5C, since the titanium contained in the first brazing material condenses on the ceramic surface, the titanium layer 341 is formed, and a component of the brazing material is melted and fixed between the titanium layer 341 and the metal member 33, thereby joining them airtightly. In addition, in this figure, a reference numeral 36 indicates the brazing material after fixation. In addition, although, in this embodiment, the non-melted foil-like brazing material (plate shape) is used, a paste-like brazing material may be used.

Figure 6:
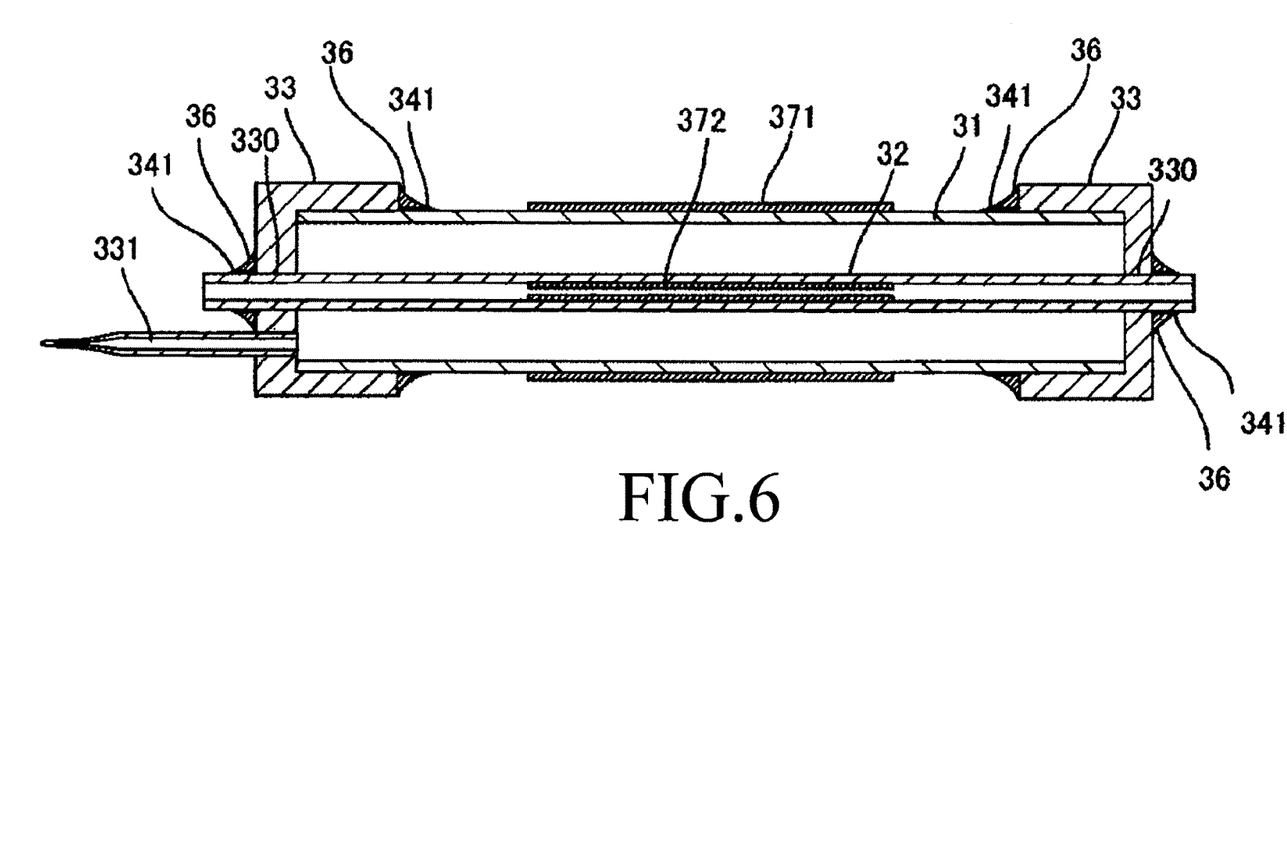
FIG. 6 is an explanatory cross sectional view of still another embodiment of the present invention, taken along a tube axis thereof.

Air is discharged from the inside of the arc tube after brazing by using the exhaust pipe 331 shown in FIG. 5A, and predetermined electric discharge gas is enclosed. By chipping off the exhaust pipe 331, the inside of the arc tube is airtightly sealed. The enclosed electric discharge gas is, for example, $F_2$—Ar mixed gas. In the ceramic discharge lamp according to this embodiment shown in FIG. 6, one external electrode 371 is finally arranged on the outer circumferential surface of the first ceramic member, and the other external electrode 372 is arranged on the inner circumference face of the second ceramic member. If a high-frequency high-voltage is impressed to the external electrodes 371 and 372, dielectrics barrier electric discharge is formed in the radius direction though the ceramic wall 31 and 32.

In the above-described first and second embodiments, description of the cap-like member is given as an example of the metal members, which is joined, to the ceramic member. The present invention is not limited to the shape of such a metal members, but other structures can be adapted.

Figure 7A:
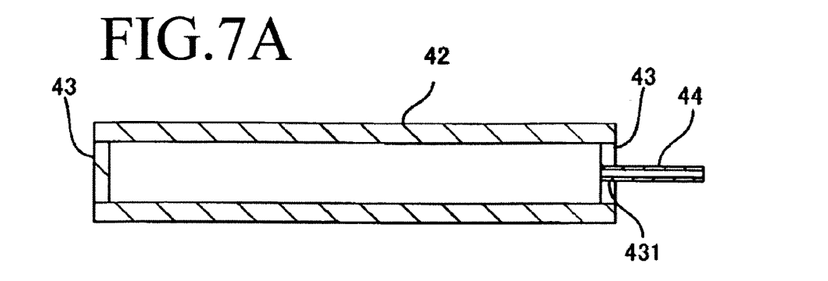
FIGS. 7A, 7B, 7C and 7D are explanatory cross sectional views of still another embodiment of the present invention, taken along a tube axis thereof.
Figure 7B:
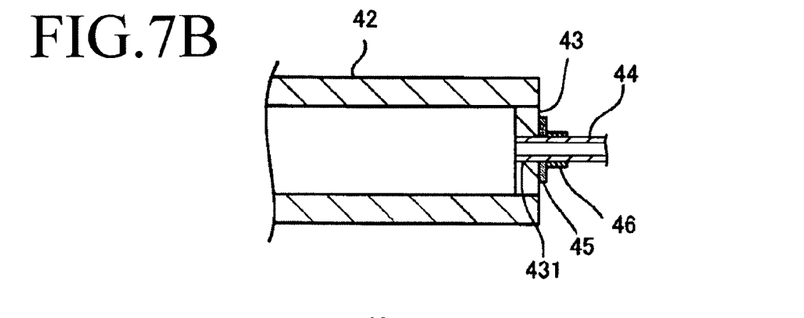
Figure 7C:
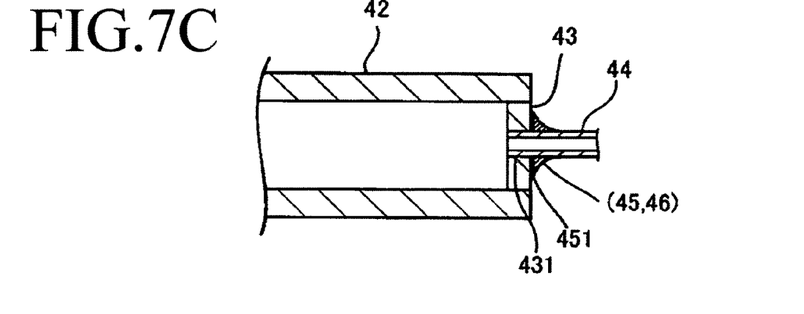
Figure 7D:
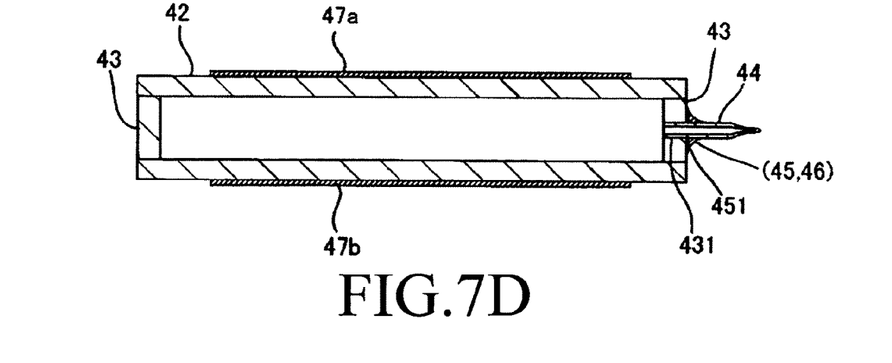

FIGS. 7A through 7D are diagrams showing a manufacturing method of a lamp, wherein FIGS. 7A and 7D is a cross sectional views of a ceramic arc tube according to still another embodiment, and FIGS. 7B and 7C are enlarged views of an end portion thereof. The lamp according to this embodiment is an example of an excimer lamp having the structure similar to that explained in FIG. 1. The arc tube 41 is made of ceramic almost entirely since it is integrated in a state where disk-like ceramic members 43 are inserted in the respective end portions of the tubular ceramic member 42. A hole 431 for exhaust pipe connection is formed on the central portion of the plate-like ceramic member 43. The one end of the exhaust pipe 44, which consists of metal, is inserted in the inside of this hole 431 (FIG. 7A).

As shown in FIG. 7B, while the first brazing material 45 which contains titanium is arranged on the plate-like ceramic member 43 in a non-melted state, the second brazing material 46 is arranged on the outer circumference of the exhaust pipe 44 so that the first and second brazing materials 45 and 46 are brought into contact therewith. The first brazing material 45 is an active silver solder, and the second brazing material 46 may be suitably selected from well-known brazing materials.

If brazing processing (heating at temperature of 800° C. for 10 minutes in a vacuum atmosphere of $1\times10^{-2}$ or less Pa) is performed in a state where the first and second brazing materials 45 and 46 are arranged on the required portions after an appropriate time, while the brazing materials 45 and 46 are melted and a titanium layer is formed in the predetermined area on the ceramic member 43, it is joined to the metal member, which forms the exhaust pipe 44 by the silver and copper components in the brazing material. FIG. 7C shows such a state.

As shown in FIG. 7D, a pair of external electrodes 47a and 47b are formed on this arc tube, and, for example, when it is airtightly sealed after electric discharge gas is enclosed, such as $F_2$—Ar mixed gas from the exhaust pipe 44, the excimer lamp 40 according to this embodiment is completed.

As mentioned above, although the present invention is described based on the above-mentioned embodiments, it is not limited to the use of the above-described excimer lamp. It can also apply to other discharge lamps.

Embodiment 1

The excimer lamp according to the present invention was prepared according to the structure shown in FIG. 1 and under conditions set forth below. The full length of an arc tube 11 is 200 mm. A tubular ceramic member 12 is made of transparent $A_2O_3$, the outer-diameter thereof is φ10 mm, and the inner diameter thereof is φ7.6 mm (the wall thickness is 1.2 mm). A metal member 14 made of nickel (Ni) and having a bottom was formed by deep-drawing a board whose thickness was 0.1 mm, so that the inner diameter thereof was 10.0 mm, the outer diameter thereof was 10.2 mm, and the height thereof was 6 mm. Each of the external electrodes 13a and 13b was a golden electrode, the thickness thereof was 10 μm (micrometer), the width thereof was 2 mm, and the full length thereof was 100 mm. The electric discharge gas was $F_2$—Ar gas (40 kPa). A first brazing material (non-melted state) was an active silver solder. A second brazing material (non-melted state) was an active silver solder. In a state where the metal member was inserted at the end portion of the ceramic member, the first brazing material having a width of 3 mm, which was formed by cutting out foil-like brazing material with a thickness of 0.1 mm in the non-melted state, was directly winded around the outer circumferential surface of the end portion of the ceramic member. Next, the second brazing material having a width of 5 mm, which was formed by cutting out plate shaped brazing material having a thickness of 0.1 mm, was winded so as to overlap with both of the metal member and the first brazing material. Then, it was heated in the vacuum atmosphere of $1\times10^{-2}$ or less Pa, at temperature of 800° C. for 10 minutes, so as to melt and fix the brazing materials, whereby the metal member and the ceramic member were joined to each other. After an appropriate time, air was discharged from the inside of the arc tube, gas for electric discharge of predetermined quantity was enclosed therein, and airtight sealing was carried out thereto, thereby the external electrode was formed and the excimer lamp was prepared.

When this excimer lamp was turned on at voltage of 8 kV (p-p) with high frequency, no problem was found in terms of the airtightness of the arc tube, and the predetermined light emission could be obtained, whereby it was confirmed that brazing was certainly performed.

The preceding description has been presented only to illustrate and describe exemplary embodiments of the present ceramic discharge lamp and method of manufacturing ceramic discharge lamp. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A ceramic discharge lamp in which an electric discharge gas is enclosed in an arc tube made up of a ceramic member and a metal member, comprising:
   a first brazing material formed to be fixed on a surface of the ceramic member without being covered with the metal member;
   a titanium layer formed between the first brazing material and the ceramic member; and
   a second brazing material, which is continuously formed from the first brazing member, that covers part of the metal member so that the ceramic member and the metal member are airtightly joined to each other.

2. The ceramic discharge lamp according to claim 1, wherein the metal member consists of nickel or nickel alloy, and the first brazing material on the ceramic member and the titanium layer may be formed so as to be fixed up to a portion at a predetermined distance from the metal member.

3. The ceramic discharge lamp according to claim 2, wherein the brazing material may be silver solder.

4. The ceramic discharge lamp according to claim 1, wherein the brazing material may be silver solder.

5. A method of manufacturing a ceramic discharge lamp having an arc tube made up of a ceramic member and a metal member according to claim 1, the method comprising the following steps of:

arranging a first brazing material containing titanium of 0.5-10 Wt %, on a surface of the ceramic member; and arranging a second brazing material on a surface of the metal member, wherein the metal member is located at an end portion of the ceramic member so that part of the first brazing material is exposed, and heating the ceramic member and the metal member to a brazing temperature so that the first brazing material and the second brazing material are melted for fixation in a state where the first brazing material and the second brazing material are continuously formed; and airtightly enclosing electric discharge gas in the arc tube.

6. The method according to claim 5, wherein the first brazing material formed on the ceramic member may be active silver solder.

* * * * *